June 19, 1934.   F. W. BECRAFT   1,963,610
MULTIPLEX ROTARY FILTER
Original Filed Oct. 17, 1930
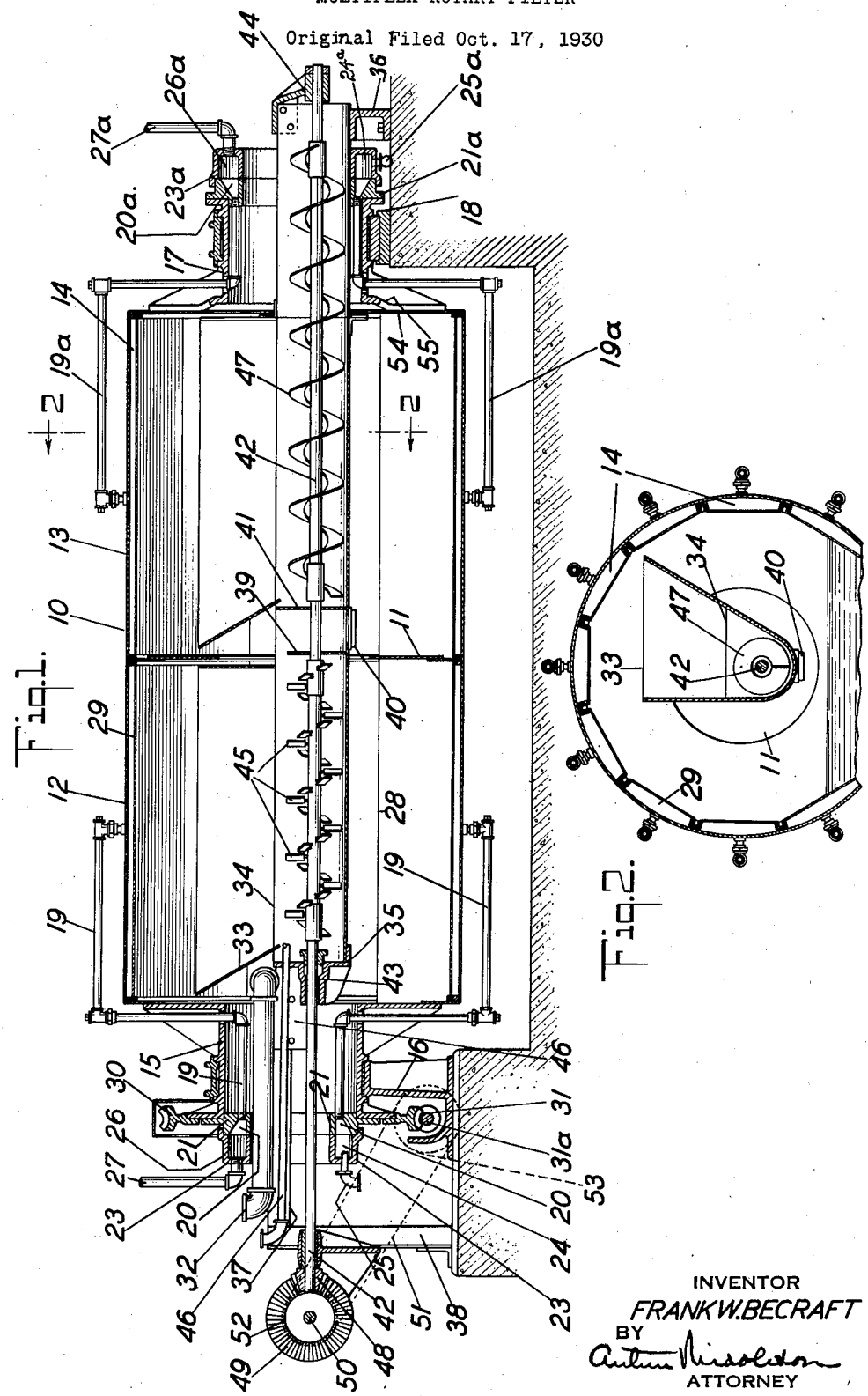
INVENTOR
FRANK W. BECRAFT
BY
ATTORNEY Patented June 19, 1934

1,963,610

UNITED STATES PATENT OFFICE 1,963,610

MULTIPLEX ROTARY FILTER

Frank W. Becraft, Denver, Colo., assignor, by mesne assignments, to The Dorr Company, Inc., New York, N. Y., a corporation of Delaware Application October 17, 1930, Serial No. 489,336
Renewed August 15, 1933

6 Claims. (Cl. 210—202)

The invention relates to rotary filters and more particularly to multiplex rotary filters including a plurality of filter units arranged end to end and rotated about a common axis, and provisions whereby the cake from one filter unit is washed and repulped and is transferred directly to the next filter unit.

Heretofore it has been proposed to rotate a plurality of filter units about a common axis and to wash and repulp the cake from one unit and then filter the pulp thus formed in another filter unit; but such proposed forms of apparatus have involved the use of separate repulping tanks and have in general been complicated and unsatisfactory. According to the present invention, each filter unit includes a rotary member having the filter material arranged around its periphery; these units are arranged end to end in compact form; and, in each unit before the last, the cake removed from the corresponding rotary member is repulped before leaving the corresponding unit and is then transferred to the next unit.

The main object of the invention is to provide a multiplex rotary filter which avoids various disadvantages of those heretofore proposed, which is compact, and which is efficient for effecting such washing and repulping of the cake for subjecting the pulp thus formed to filtration.

The objects of the invention may be attained in general by arranging end to end of a plurality of rotary filter units connected together for rotation about a common axis by a common rotating means, and by providing in connection with each unit but the last and constituting in effect a part of such unit, means for repulping and washing the cake from such unit and transferring the pulp thus formed to the next unit. In a preferred form of the invention, two rotary filters of the internal type are placed end to end and provided with pressure controlling valves at opposite ends, each valve controlling the variations of pressure for the adjacent filter or filter unit. The pulp is introduced at the interior of one of the filter units and the cake is formed on the inner surface of the filter material of each of the filter cells while it is passing through the lower or suction part of its path and discharged therefrom while the cell is passing through the upper or pressure part of its path. The cake thus separated from the filter material of one unit is deposited in a trough extending through the unit in the direction of the axis of rotation and is there pulped with liquid supplied thereto, the pulp thus formed passing directly into the interior of the second unit. The pulp in the second unit is filtered and the cake discharged into a conveyor extending through this unit and acting to discharge the cake at the end farther from the first unit.

Other objects and advantages will be apparent upon consideration of the following detailed description and of the drawing, in which:—

Fig. 1 is a longitudinal sectional view taken along a vertical plane passing through the axis of the revolving filter structure; and Fig. 2 is a vertical sectional view taken on the line 2—2 of Fig. 1 and looking in the direction of the arrows.

Referring to the drawing, 10 designates a duplex filter drum separated by an annular wall or partition 11 into two units 12 and 13, each of which constitutes a separate drum or drum section and is provided at its periphery with a plurality of cells 14 (Fig. 2) at the interior of the corresponding section of the drum. The drum is provided at the outer end of the unit 12 with a hollow trunnion 15 rotatably mounted on a support 16, and at the outer end of the unit 13 with a hollow trunnion 17 rotatably mounted on a support 18. Connected with each of the cells 14 of the unit 12 is a conduit or pipe 19 of which a part extends radially and inwardly, adjacent to the outer end of the unit, into the hollow trunnion 15 and then, parallel to the axis of the trunnion, to the end of a port 20 in a rotatable annular valve member 21 secured to the trunnion at its outer end.

Each port 20 has a round, internally threaded end into which the end of the corresponding pipe 19 is threaded, and from such round end the port is gradually spread radially of the annular valve member until it assumes the form of a radial slit at the other side of the valve member, the cross sectional area being substantially the same from one end to the other of the port. These slits register with a channel in a stationary valve member or cover 23 which is divided in a known manner into a number of different compartments by dams (not shown). At the lower part of the channel there is a compartment or chamber 24 connected with a suction line 25 through which the filtrate is withdrawn, and at the upper part of the channel there is a compartment 26 connected with a pressure line 27.

It will be evident that, while each cell of the filter unit 12 is below the normal liquid level 28, the filtrate will be drawn through the filter material 29, through the corresponding pipe 19, through the compartment 24, and out through the suction line 25 to any desired point. The suction will be thrown on as soon as the corresponding narrow slit forming the outer end of a port 20 passes the dam at the forward side of the compartment 24, and will be cut off as soon as the slit is closed by the dam at the exit end of the compartment, the slit form of the end of the port assuring a quick change in pressure conditions in the pipe 19. In the same fluid, such as air under pressure will be admitted quickly and shut off quickly in each pipe 19 as the radial slit of the corresponding port moves into communication with or out of communication with the compartment 26.

The arrangement of the parts for controlling the pressure variations at the outer end of the unit 13 is substantially the same as that for the unit 12 and includes conduits or pipes 19a extending from the cells 14 into the hollow trunnion 17 and to the outer end thereof and communicating with ports 20a in a rotatable valve member 21a and registering with a channel in a stationary valve member or cover 23a. The channel in the member 23a is divided in a known manner by dams (not shown) into compartments, one of which 24a at the lower part of the channel is connected with a suction line 25a and another of which 26a at the upper part of the channel is connected with a pressure line 27a.

The drum may be rotated by suitable means including a worm gear 30 fixed on the trunnion 15 and meshing with a worm 31 on a shaft 31a and the pulp or material to be filtered is introduced into the unit 12 by means of a supply pipe 32 extending inwardly through the hollow trunnion 15 and with its end properly located to discharge the pulp into the low part of the unit. During the rotation of the drum each cell of the unit 12 will be subjected to suction as it passes beneath the pulp in the lower part of the unit and filtrate will be removed and cake formed on the corresponding portion of filter material at the surface thereof facing inwardly toward the axis of the drum; and as such cell reaches the upper limit of its path it will be subjected to an internal blast of fluid under pressure and the cake will be separated from the filter material or fabric and will fall into a chute 33 from which it will pass into a trough 34.

This trough 34 is closed at one end by an end member 35 located just inside the unit adjacent to the end to which the trunnion is attached and extends in the other direction through the central opening in the annular partition 11 and out through the trunnion 17 to a point beyond the outer end of the trunnion and at the point is sustained by a support 36. The trough is also supported at the end member or head 35 by means including members 37 connected with the head and extending outwardly through the trunnion 15 to a point beyond the outer end thereof, and a support 38 to which the members 37 are connected at that point. The trough 34 is divided into a mixing or repulping portion in which the cake from the unit 12 is mixed and repulped and extending from the head 35 to a wall or weir 39 located substantially in the plane of the annular partition 11 and over which the pulp from the repulping portion flows into the lower part of the second unit through an outlet 40 in the bottom of the trough; and a conveying portion extending from a partition or wall 41, positioned across the trough at a point spaced from the weir 39 to provide a compartment of sufficient length to accommodate the overflow from the weir to the outlet 40, out through the trunnion 17 to the end of the trough which serves as a discharge outlet.

The repulping in the repulping portion of the trough and the conveying in the conveying portion of the trough are effected by means including a shaft 42 journalled in the support 38 and extending therefrom through the trunnion 15, a packing box 43 in the head 35, the partition or weir 39, the wall or partition 41, and the trunnion 17 to the end of the trough where it is journalled in a bracket 44 preferably supported on the trough. Between the head 35 and the weir 39, the shaft 42 is provided with a plurality of radial blades 45 so inclined to planes perpendicular to the axis of the shaft as to have a conveying action toward the weir 39 and also positioned in helical arrangement so as to enable the mixing or repulping action to be produced at all points along the repulping portion of the trough and also to assist in the conveying action. The liquid used in the repulping operation may be supplied through a pipe or pipe line 46 extending inwardly through the trunnion 15 and communicating with an opening in the head 35. Between the partition 41 and the bracket 44, the shaft 42 is provided with a helical conveyer blade 47 extending around the shaft in the same general direction as the series of interrupted blades 45.

Rotation of the shaft 42 may be effected by suitable operating means including a bevel gear 48 fixed on the shaft adjacent to the support 38, and a bevel gear 49 meshing with the bevel gear 48 and mounted on a shaft 50; and in order that the two shafts may be driven from the same source of power they may be connected together in any suitable manner as, for example, by means of a flexible connection or belt 51 passing around a pulley 52 on the shaft 50 and a pulley 53 on the shaft 31a.

The repulped material discharged into the lower part of the filter unit 13 is acted upon in the same manner as the original pulp is acted upon the unit 12; that is, as each cell of the unit 13 passes beneath the pulp, the corresponding conduit 19a is brought into communication with the suction chamber 24a and filtrate is drawn through the filter material into the cell and from the cell through the conduit 19a, the suction compartment 24a and the suction line 25a and is carried by the latter to any desired point. At the same time, solid material in the pulp is drawn against the filter material and collects in the form of cake which, when the cell reaches the upper part of its path and the corresponding conduit 19a comes into communication with the pressure chamber 26a, will be separated from the filter material and will fall into a chute 33 and pass therefrom into the conveying portion of the trough 34. The cake falling into this portion of the trough will be conveyed by the conveyer blade 47 along the trough through the hollow trunnion 17 and discharged from the outer end of the trough.

In the event that the filtrate in the unit 12 is not drawn off fast enough in proportion to the rate of supply of pulp, the pulp may overflow through the opening at the center of the annular partition 11 into the unit 13. Under similar conditions liquid in the unit 13 may overflow through the opening at the center of the annular outer wall 54 thereof, the spider 55 at the inner end of the hollow trunnion 17 being constructed to permit this action.

It should be understood that the embodiment of my invention described is used for illustrative purposes and not limiting one so that various changes may be made in the construction or arrangement of the parts and that certain parts may be used without others without departing from the true spirit and scope of the invention.

I claim:

1. In filtering and washing apparatus, the combination of two filter units including two rotary drums placed end to end and connected together to rotate about their common axis, a trough extending along the drum of the first unit to receive cake therefrom and arranged to discharge material to the second unit, mixing means acting on the cake in said trough for repulping the cake, a second trough extending along the drum of the second unit to receive cake therefrom, and conveying means cooperating with said second trough to move the cake from the second rotary drum to the outer end thereof.

2. In filtering and washing apparatus, the combination of two filter units including two rotary drums placed end to end and connected to rotate about their common axis, a trough extending along the drum of the first of said units to receive cake therefrom and arranged to discharge into the second unit, mixing means acting on the cake in said trough for repulping the cake including a shaft extending longitudinally of said drums and spirally arranged interrupted blades on said shaft, a second trough extending along the drum of the second unit to receive cake therefrom, and conveying means cooperating with said second trough to move the cake from the second drum to the outer end thereof and operable through the shaft of said mixing means.

3. In filtering and washing apparatus, the combination of two filter units including two rotary drums placed end to end and connected to rotate about a common axis, a trough extending along the drum of the first unit to receive cake therefrom and arranged to discharge into the second unit, mixing means acting on the cake in said trough for repulping the cake and including a shaft substantially parallel to the axis of said drums, a second trough extending along the drum of the second unit to receive cake therefrom, and conveying means cooperating with said second trough to move the cake from the second trough to the outer end thereof and including a shaft forming an extension of the shaft of said mixing means.

4. In filtering and washing apparatus, the combination of two filter units including two rotary drums placed end to end and connected to rotate about their common axis, a trough extending along the drum of the first of said units to receive cake therefrom, a weir over which liquid may overflow from said trough into the other or second unit, means for feeding liquid into said trough, means for mixing said liquid and said cake in said trough to repulp the cake so that the pulp will overflow said weir and including a shaft extending through said trough longitudinally, a second trough in alignment with the first trough and extending along the second drum to receive cake therefrom, an extension of said shaft passing through the second trough longitudinally, and a screw conveyer mounted on said extension.

5. In filtering and washing apparatus, the combination of two rotary filter drums secured together end to end for rotation about a common axis, means for supporting said drums including aligned hollow trunnions secured to the outer ends of said drums, a trough in the first drum to receive the cake therefrom and having a weir at its inner end over which pulp in said trough may flow into the other filter drum, a rotatable mixing device in said trough and extending longitudinally thereof, means for supplying pulp to the interior of the first unit through the trunnion at the outer end thereof, means for supplying wash liquid to said trough through the same trunnion, and means for collecting the cake in the second unit and discharging it through the outer end thereof.

6. In filtering and washing apparatus, the combination of a rotary internal filter provided with filter cells arranged around the periphery thereof, means for withdrawing filtrate and forming cake on each cell as it passes through the lower part of its path and discharging the cake as the cell passes through the upper part of its path and repulping means including a trough in said filter and having a weir across the same at a position to discharge overflow from one end of said filter and a mixer in said trough.

FRANK W. BECRAFT.